Jan. 21, 1930.   C. H. LINN   1,744,558
MANUALLY AND AUTOMATICALLY ADJUSTABLE TRUCK SPRING
Filed Feb. 16, 1929
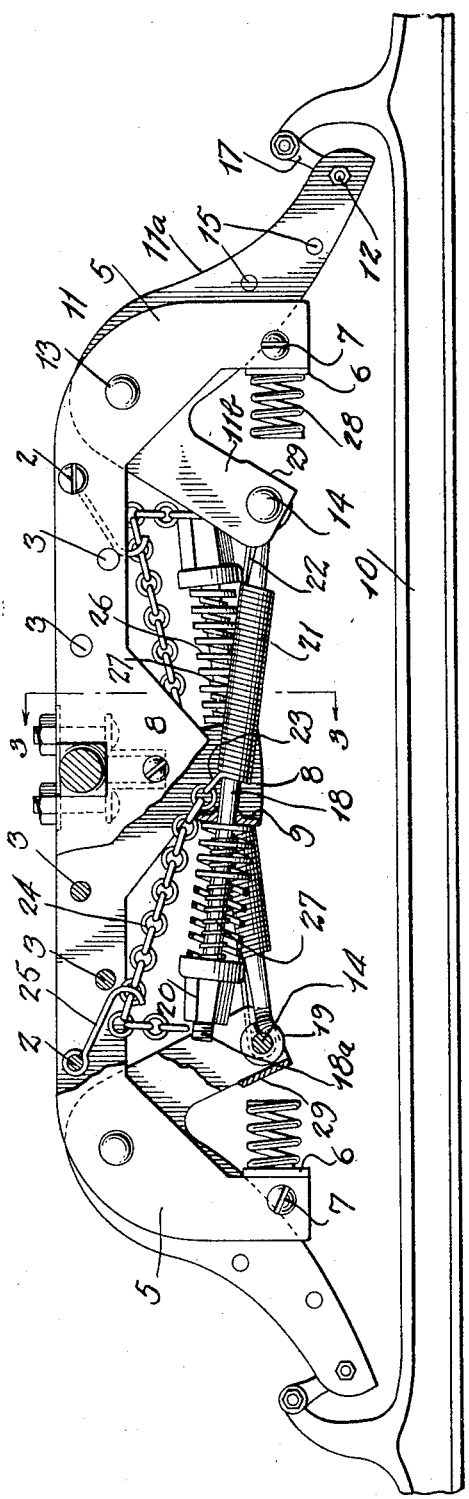

Patented Jan. 21, 1930

1,744,558

UNITED STATES PATENT OFFICE

CHARLES H. LINN, OF SAN FRANCISCO, CALIFORNIA

MANUALLY AND AUTOMATICALLY ADJUSTABLE TRUCK SPRING

Application filed February 16, 1929. Serial No. 340,553.

This invention relates to certain new and useful improvements in automobile truck springs that are both manually and automatically adjustable, the springs being manually adjustable to regulate the tension thereof for the support of predetermined loads and automatically adjustable to provide the proper spring support for suspension of the automobile truck body when under heavy or light loads.

A further object of the invention is to provide an automobile truck spring in which a spring carrying frame supporting a vehicle body has link connections with chassis frame or axle bars, separate sets of springs being provided with one set operating initially for the support of light loads with the other set of springs being rendered operative under the strain of heavy loads when both sets of springs are effective so that the truck spring functions for the support of relatively heavy and light loads.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a side elevational view, partly broken away and shown in section, showing the automobile truck spring associated with the bolster and having link connection with a chassis frame or axle;

Figure 2 is a top plan view of the spring bolster construction; and

Figure 3 is a cross-sectional view taken on line 3—3 of Figure 1.

The spring mechanism for the automobile truck is associated with the bolster that comprises three spaced plates 1 connected together by screw bolts 2 with spacing collars 4 thereon to hold the plates 1 of the bolster in spaced relation. The opposite ends of the three bolster plates 1 carry downwardly extending arms 5 bridged on the inner sides adjacent the lower end by the plate 6 and connected by the cross bolts 7. The central portion of the central plates 1 carry depending plate extensions 8 with the outer plate extensions 8 having a cross arm connection 9 with the intermediate plate extension 8 at opposite ends thereof.

The connection between the bolster frame and chassis or axle bar 10 comprises a plate construction of bell-crank formation having three angular plates 11 connected together by screw bolts 12, 13 and 14 and pins 15 upon which spacing collars 16 are mounted, the screw bolt 12 having a link connection 17 with the chassis bar 10 at the ends 11ª of the plates 11 while the screw bolts 13 pivotally connect the plates 11 to the depending end arms 5 of the plates 1.

The spring devices associated with the bolster frame comprise a pair of rods 18 having an enlarged laterally offset pivot head 19 at one end pivotally mounted upon the screw bolt 14 connecting the plate end 11ᵇ of the end plates 11, the bolts being disposed beneath the central portions of the bolster plates 1 and between said plates as shown in Figure 2. Each bolt 18 freely extends through an opening in the adjacent connecting wall 9 of the depending central portions 8 of the bolster plate 1 with the free end thereof threaded as at 18ª for the reception of a spring compressing nut 20. A coiled spring 21 incloses the rod 18 between the pivot bolt 14 and plate 9, one end 22 of the spring 21 being anchored to the screw bolt 14 while its other end 23 is connected to a link chain 24 adjustably engaged with the hook 25 upon the plate connecting screw bolt 2 as shown in Figure 1. A relatively large and heavy coil spring 26 incloses the rod 18 between the plate 9 and nut 20, the tension thereon being varied by adjusting the nut while a smaller coil spring 27 incloses the same end of the rod 18 within the outer larger coil spring 26. A pair of relatively heavy coil springs 28 are anchored at one end to the plate 6 carried by the inner edges of the lower ends of the end arms 5 of the bolster plate with the free ends thereof engaged by the connecting plates 29 at the outer lower side edges of the end portions 11ᵇ of the plates 11 when the bolster is under heavy load.

The bolster frame comprises plates 1 and is spring supported and has the pivot plate connection 11 with the chassis bar 10. The tension of the springs 21 is adjusted by the chain and hook connection 24 and 25 with the bolster plate while the tension of the spring 26 is changed by the adjusting nuts 20, the tension of the springs 28 remaining constant. Under light loads, the weight is supported by the springs 21 and springs 26, increasing weight being absorbed by expansion of the spring 21 and compression on the springs 26, the inner smaller springs 27 being brought into play after the larger springs 26 have been partially compressed to aid in spring suspension. During this action, the end frame plates 11 move upon their pivotal mounting 13 to shift the rods 18 for compressing and expanding the respective springs and also moving the plate ends 11$^b$ of the pivoted end plates 11 toward the spring 28, and under excessive loads, the lower ends of the plate parts 11$^b$ move into engagement with the relatively heavy springs 28 for the resilient support of heavy loads.

From the above detailed description of the invention, it is believed that the construction and operation thereof will at once be apparent, and while there is herein shown and described the preferred embodiment of the present invention, it is nevertheless to be understood that minor changes may be made therein without departing from the spirit and scope of the invention as claimed.

I claim:—

1. In an automobile truck spring, a bolster frame, end members pivoted to the bolster frame and having link connection with the truck chassis and spring devices connecting the bolster frame, and end members including rods attached to the end members, a coil spring on each rod anchored at one end to the adjacent end member, and a flexible connection between the other end of the spring and bolster frame.

2. In an automobile truck spring, a bolster frame, end members pivoted to the bolster frame and having link connection with the truck chassis and spring devices connecting the bolster frame, and end members including rods attached to the end members, a coil spring on each rod anchored at one end to the adjacent end member, and an adjustable connection between the other end of the spring and bolster frame.

3. In an automobile truck spring, a bolster frame, end members pivoted to the bolster frame and having link connection with the truck chassis and spring devices connecting the bolster frame, and end members including rods attached to the end members, a coil spring on each rod anchored at one end to the adjacent end member, an adjustable connection between the other end of the spring and bolster frame, plates on the bolster frame through which the rods pass, a coil spring on the end of each rod beyond the plate, and a nut threaded on the end of the rod into engagement with the spring for varying the tension thereof.

4. In an automobile truck spring, a bolster frame, end members pivoted to the bolster frame and having link connection with the truck chassis and spring devices connecting the bolster frame, and end members including rods attached to the end members, a coil spring on each rod anchored at one end to the adjacent end member, an adjustable connection between the other end of the spring and bolster frame, plates on the bolster frame through which the rods pass, a coil spring on the end of each rod beyond the plate, a nut threaded on the end of the rod into engagement with the spring for varying the tension thereof, and a smaller coil spring on the rod within the last named spring rendered operative in the pressure of heavier loads.

5. In an automobile truck spring, a bolster frame, end members pivoted to the bolster frame and having link connection with the truck chassis and spring devices connecting the bolster frame, and end members including rods attached to the end members, a coil spring on each rod anchored at one end to the adjacent end member, an adjustable connection between the other end of the spring and bolster frame, plates on the bolster frame through which the rods pass, a coil spring on the end of each rod beyond the plate, a nut threaded on the end of the rod into engagement with the spring for varying the tension thereof, and heavier compression springs on the bolster frame with which the end members are engaged under heavier load pressure.

6. In an automobile truck spring, a bolster frame, end members pivoted to the bolster frame and having link connection with the truck chassis and spring devices connecting the bolster frame, and end members including rods attached to the end members, a coil spring on each rod anchored at one end to the adjacent end member, an adjustable connection between the other end of the spring and bolster frame, plates on the bolster frame through which the rods pass, a coil spring on the end of each rod beyond the plate, a nut threaded on the end of the rod into engagement with the spring for varying the tension thereof, a smaller coil spring on the rod within the last named spring rendered operative in the pressure of heavier loads, and heavier compression springs on the bolster frame with which the end members are engaged under heavier load pressure.

In testimony whereof I affix my signature.

CHARLES H. LINN.